US009985851B2

(12) United States Patent
Lindo

(10) Patent No.: US 9,985,851 B2
(45) Date of Patent: May 29, 2018

(54) CONTROLLING REPORTING BY AN INSTRUMENT ENCAPSULATION MODULE ENCAPSULATING AN APPLICATION PROGRAM ON A USER TERMINAL

(71) Applicant: CA, INC., New York, NY (US)

(72) Inventor: Jonathan Lindo, Emerald Hills, CA (US)

(73) Assignee: CA, INC., New York, NY (US)

( * ) Notice: Subject to any disclaimer, the term of this patent is extended or adjusted under 35 U.S.C. 154(b) by 172 days.

(21) Appl. No.: 14/577,173

(22) Filed: Dec. 19, 2014

(65) Prior Publication Data
US 2016/0182322 A1 Jun. 23, 2016

(51) Int. Cl.
*G06F 15/173* (2006.01)
*H04L 12/26* (2006.01)
*H04L 12/24* (2006.01)

(52) U.S. Cl.
CPC .......... *H04L 43/06* (2013.01); *H04L 41/0813* (2013.01); *H04L 43/04* (2013.01); *H04L 43/16* (2013.01)

(58) Field of Classification Search
CPC ..... H04L 41/0813; H04L 43/06; H04L 43/04; H04L 43/16; H04L 43/08; H04L 43/0823
USPC .......................................................... 709/224
See application file for complete search history.

(56) References Cited

U.S. PATENT DOCUMENTS

2007/0039049 A1* 2/2007 Kupferman ......... G06F 11/3495
726/22
2009/0299940 A1* 12/2009 Hayes .................... G06N 5/025
706/47
2010/0167713 A1* 7/2010 Hoffman ............. H04M 3/2227
455/418
2011/0119375 A1* 5/2011 Beeco .................. H04L 41/0677
709/224
2013/0346594 A1* 12/2013 Banerjee ............. G06F 11/3495
709/224
2014/0188897 A1* 7/2014 Baker ................ G06Q 30/0631
707/748

OTHER PUBLICATIONS

Google search of dictionary "from across" https://www.google.com/search?q=dictionary+%22+from+accross%22&oq=dictio&aqs=chrome.2.69i57j69i60j69i59j35i3912j0.14383j0j4&sourceid=chrome&ie=UTF-8.*

* cited by examiner

*Primary Examiner* — Douglas Blair
*Assistant Examiner* — Tan Doan
(74) *Attorney, Agent, or Firm* — Sage Patent Group

(57) ABSTRACT

A method includes performing operations as follows on a processor that include receiving metrics reported by user terminals via a data network. The metrics indicating a measured operation of an application program processed by the user terminals. The operations further include determining when a collection of the metrics received from across the user terminals satisfies a rule for modifying metric reporting, and communicating a metric reporting modification command to the user terminals, based on the collection of the metrics received from across the user terminals satisfying the rule for modifying metric reporting, to control future metrics reported by the user terminals for the measured operation of the application program. Related computer program products and systems are disclosed.

8 Claims, 4 Drawing Sheets

CONTROLLING REPORTING BY AN INSTRUMENT ENCAPSULATION MODULE ENCAPSULATING AN APPLICATION PROGRAM ON A USER TERMINAL

BACKGROUND

The present disclosure relates to computing systems, and, in particular, to management of application programs processed by user terminals.

During the development, testing, and production of application programs it is desirable to collect metrics relating to the operation of the application programs on user terminals. The metrics can be reported to support servers for analysis of, for example, root causes of errors or undesirable operation, how user's typically interface with the application programs, user experience improvement opportunities, etc. While the metrics are helpful for improving the operation of application programs operations and the associated users' experiences, for providing such instrumentation, metric storage, and communication of metrics undesirably utilizes resources of all infrastructure involved in such operations.

SUMMARY

In some embodiments of the present disclosure, a method includes performing, on a processor of an application analysis computer, operations that include receiving metrics reported by user terminals via a data network and determining when a collection of the metrics received from across the user terminals satisfies a rule for modifying metric reporting. The metrics indicating a measured operation of an application program processed by the user terminals. The operations further include communicating a metric reporting modification command to the user terminals, based on the collection of the metrics received from across the user terminals satisfying the rule for modifying metric reporting, to control future metrics reported by the user terminals for the measured operation of the application program.

In further embodiments of the present disclosure, a computer program product includes tangible computer readable storage medium including computer readable program code embodied in the medium that when executed by a processor of a user terminal causes the processor to perform operations including modifying a condition defined by a metric reporting rule based on a metric reporting modification command received from an application analysis computer via a data network, and measuring operation of an application program that is encapsulated by the computer readable program code and processed by the processor. The operations further include determining when the measured operation satisfies the condition of the metric reporting rule and communicating a metric, which indicates an operation of the application program processed by the processor, via the data network to the application analysis computer when the measured operation satisfies the condition of the metric reporting rule.

Other methods, systems, and/or computer program products according to embodiments of the inventive subject matter will be or become apparent to one with skill in the art upon review of the following drawings and detailed description. It is intended that all such additional methods, systems, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
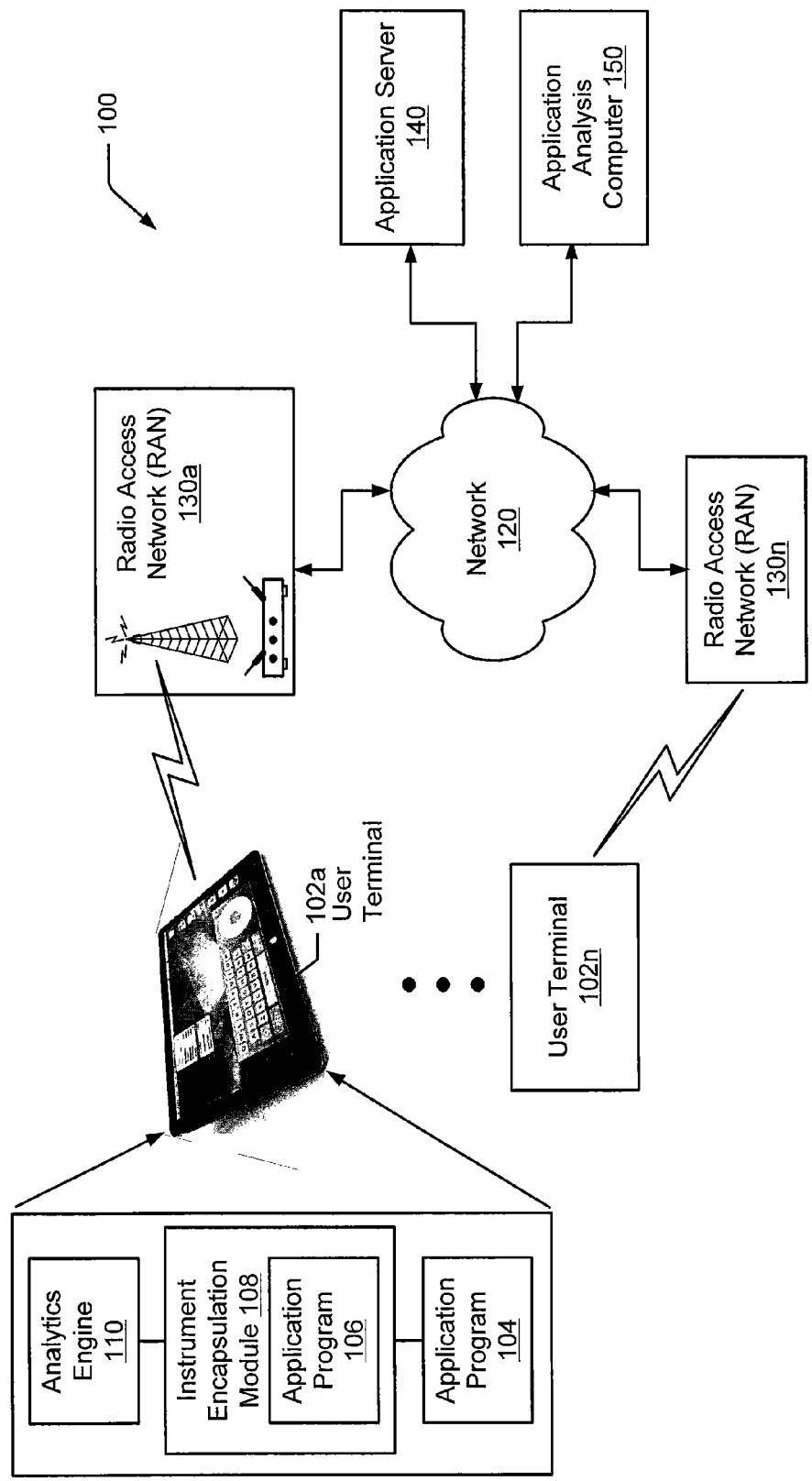
FIG. 1 is a block diagram of a system for controlling reporting of application program operational metrics by an instrument encapsulation module which encapsulates an application program processed by user terminals in accordance with some embodiments of the present disclosure.

FIG. 1 is a block diagram of a system 100 that includes a plurality of user terminals 102a-102n, radio access networks (RAN) 130a-130n, an application server 140, and an application analysis computer 150 configured according to some embodiments of the present disclosure. The user terminals 102a-102n can download application programs from the application server 140. The application server 140 may, for example, include the Apple application store server (e.g., iTunes) and/or one or more of the Android application store server (e.g., Google Play and/or Amazon Appstore).

The user terminals 102a-102n may communicate through a wireless and/or wired network connection via a data network 120 with the application server 140. For example, one or more of the user terminals 102a-102n may communicate through the radio access networks 130a-130n using one or more wireless communication protocols that may include, but are not limited to, LTE, WLAN (IEEE 802.11), WiMax, and/or Bluetooth.

Although FIG. 1 illustrates a certain number of system components for ease of illustration and explanation, it is to be understood that embodiments of the present disclosure are not limited to the illustrated configuration but instead are intended to encompass any configuration capable of carrying out at least some of the operations described herein.

Over a billion Apple IOS user terminals and Android user terminals are presently being used throughout the world. These user terminals connect through data networks 120

(e.g., Internet) to application servers 140 to download application programs for processing. The application programs can include gaming programs, spreadsheet programs, multimedia programs, word processing programs, database programs, presentation programs, etc.

During the development, testing, and production of these application programs it is desirable to collect metrics relating to the operation of the application programs on user terminals. The metrics can be reported through messages generated by the application programs and communicated through the data network 120 to the application server 140 for analysis of, for example, root causes of errors or undesirable operation, how user's typically interface with the application programs, user experience improvement opportunities, etc.

Some embodiments of the present disclosure may stem from the present realization the types of metrics that are collected, how often metrics are reported, and the events that trigger reporting have been statically defined by the structure of programming code within the application programs themselves.

The operations for providing such instrumentation for generating metrics, storage of metrics, communication of reported metrics, and analysis of reported metrics utilizes resources of all system components performing such operations. While this resource utilization can be acceptable during development and small scale beta testing, it may become unacceptable when greatly scaled-up across perhaps several hundred thousand, million, or hundred million user terminals. Design tradeoffs have necessarily occurred between balancing interests in collecting sufficiently detailed metrics to enable desired analysis while avoiding wasteful utilization of resources.

Various embodiments of the present disclosure are directed to providing dynamic controllability of the collection and reporting of operational metrics for application programs based on occurrence of defined events. Rules are defined that control the types of metrics that are collected and/or reported, control how often the metrics are collected and/or reported, and/or control what event condition triggers collection and/or reporting of metrics. These embodiments may operate to dynamically adapt the collection and/or reporting of metrics based on observable events associated with operation of application programs. This may provide an improved ability to dynamically optimize a balance of the desire to collect more types of metrics and/or detailed observations of the metrics in some circumstances while avoiding the associated utilization of resources when not needed in some other circumstances.

With continued reference to FIG. 1, each of the user terminals 102*a*-102*n* include an instrument encapsulation module 108 that operates to collect defined operational metrics for an application program 106 operating on the user terminal. The instrument encapsulation module 108 may "wrap around" the application program 106 to intercept or otherwise observe application programming interface (API) calls from the application program 106 to other application programs 104 processed by the user terminal, an operating system processed by the user terminal, and/or other software/hardware resources of the user terminal.

As used herein, an "API request" can be any signaling occurring from one to another software application that may be performed using a defined syntax and one or more parameters (e.g., data structure, object classes, and/or variables) to obtain data therefrom and/or to provide data thereto. For example, SOAP and REST service requests can be performed using a defined API library of remote calls or other types of API requests.

The instrument encapsulation module 108 may process the observed operational metrics through an analytics engine 110 to generate information that is communicated to the application analysis computer 150 via the data network 120, and/or the instrument encapsulation module 108 may communicate the observed operational metrics to the application analysis computer 150 for processing through an analytics engine residing therein.

Although the application analysis computer 150 has been illustrated as being separate from the application server 140, some or all of the functionality of the application analysis computer 150 may be combined with the application server 140.

The instrument encapsulation module 108 measures operation of the application program 106 that is encapsulated. The types of operational measurements that can be performed by the instrument encapsulation module 108 for generating metrics may include any one or more of the following:

1. hardware resource utilization (e.g., application program 106 utilization of user terminal processor resources, application program 106 utilization of user terminal memory resources, rate of information displayed by the application program 106 on a display device of the user terminal, application program 106 utilization of user terminal network communication resources, etc.);
2. identification and/or characterization of the application program 106 interfacing with another application program 104, the operating system, and/or other software/hardware resources of the user terminal;
3. characteristics of the user terminal (e.g., manufacturer, operating system information, web browser information, etc.);
4. characteristics of the application program 106 (e.g., manufacturer, version, etc.;
5. identifier of the user terminal (e.g., network address, phone number, mobile ID, etc.)
6. which features and/or sequences of features of the application program 106 are used;
7. how often features and/or sequences of features of the application program 106 are used;
8. application program 106 preferred and/or present information display update rate;
9. communication latency between the application program 106 and the application program 104 and/or a network node through a network interface of the user terminal;
10. control gestures or other inputs provided to the application program 106 via a user interface;
11. screen shots captured from a user terminal display or sub-window associated with the application program 106;
12. video captured from user terminal display or sub-window associated with the application program 106;
13. geographic region of the user terminal while the application program 106 is being processed; and
14. events indicative of errors or undesirable operation of the application program 106.

The instrument encapsulation module 108 measures operation of the application program 106 which it encapsulates. The instrument encapsulation module 108 may measure operation of the application program 106 by intercepting and analyzing API calls by the application program 106 to the other application program 104 and/or to the operating system of the user terminal 102. The instrument encapsulation module 108 contains one or more metric reporting rules having one or more conditions that define one or more events which trigger reporting of operational metrics to the application analysis computer 150. The instrument encapsulation module 108 determines when the measured operation satisfies the condition of the metric reporting rule and, when satisfied, communicates a metric, which indicates an operation of the application program, via the data network 120 to the application analysis computer 150.

The instrument encapsulation module 108 uses the metric reporting rule(s) to selectively control the type(s) of operational metrics that are collected, how frequently the operational metrics are collected, and/or when the operational metrics are reported to the application analysis computer 150. The rule(s) may control where the metrics are reported, such as causing metrics to be reported only to the application server 140 while a first rule is satisfied, reported only to the application analysis computer 150 while a second rule is satisfied, and not reported to the application server 140 and the application analysis computer 150 while a third rule is satisfied. The rule(s) may control whether and/or how the analytics engine 110 further processes the operational metrics (e.g., statistically characterize or other change to the informational fidelity of the operational metrics) before persistent storage and/or reporting to the application analysis computer 150. The events may be observable by the instrument encapsulation module 108 intercepting and analyzing API calls by the application program 106 to the other application program 104 and/or to the operating system of the user terminal 102.

The condition(s) defined by the metric reporting rules(s) that can trigger collection and/or reporting of associated events may be based on occurrence of one or more of the following:

1. expiration of a threshold time and/or threshold number of operational cycles of the application program since installation or another defined event;
2. instances of the application program deployed to a threshold number of user terminals;
3. instances of the application program presently active in a threshold number of user terminals;
4. application program errors observed in a threshold number of user terminals (which may be further constrained to the same type of user terminal as the host user terminal);
5. application program errors observed having defined characteristics;
6. hardware resource utilization (e.g., CPU, memory, network, etc.) satisfying a threshold value;
7. a defined feature of the application program being used and/or a defined sequence of features of the application program being used;
8. frequency of use of a defined feature of the application program satisfying a threshold value;
9. application program information display update rate satisfying a threshold value;
10. communication latency satisfying a threshold value; and
11. occurrence of defined control gestures or other inputs from a user interface and/or frequency of such use satisfying a threshold value.

The condition(s) of the reporting rule(s) used by all of the user terminals 102*a*-102*n* for reporting metrics to the application analysis computer 150 can be defined and modified under the control of the application analysis computer 150. The application analysis computer 150 can control the type(s) of operational metrics that are reported by the user terminals 102*a*-102*n*, how frequently the operational metrics are reported, and/or what events or other conditions observed by the instrument encapsulation module 108 within each of the terminals 102*a*-102*n* triggers reporting of operational metrics to the application analysis computer 150.

The application analysis computer 150 receives metrics reported by all of the user terminals 102*a*-102*n* via the data network 120. The metrics indicate a measured operation of the application program 106 processed by each of the user terminals 102*a*-102*n*. The application analysis computer 150 determines when a collection of the metrics received from across the user terminals 102*a*-102*n* satisfies a rule for modifying metric reporting, and, based on the rule being satisfying, communicates a metric reporting modification command to the user terminals 102*a*-102*n* to control future metrics reported by the user terminals 102*a*-102*n* for the measured operation of the application program 106.

In one illustrative example, the instrument encapsulation module 108 responds to different metric reporting modification commands from the application analysis computer 150 indicating occurrence of different active phases by measuring and reporting 100 different types of metrics relating to the operation of the application program 106 during an application development phase relating to the application program 106, measuring and reporting 50 different types of metrics relating to the operation of the application program 106 during a beta testing phase, and collecting and reporting 10 different types of metrics relating to the operation of the application program 106 during a full production phase. The application analysis computer 150 can decide when to control the instrument encapsulation module 108 within each of the user terminals 102*a*-102*n* to transition between the application development phase, the beta testing phase, and the full production phase based on determining when a collection of the metrics received from across the user terminals 102*a*-102*n* satisfies a rule for modifying metric reporting.

The instrument encapsulation module 108 may autonomously revert from the full production phase level of measuring and reporting of 10 types of metrics to the beta testing phase level of measuring and reporting of 50 types of metrics based on it observing occurrence of a first level of application program performance, and further revert from the beta testing phase level of measuring and reporting of 50 types of metrics to the application development phase level of measuring and reporting of 100 types of metrics based on occurrence of a second level of application program performance. The application program performance may be measured based on one or more of the metrics disclosed above.

The application analysis computer 150 collects the metrics reported from across all of the user terminals 102*a*-102*n* reported by instances of the instrument encapsulation modules 108 processed by the terminals 102*a*-102*n*. The application analysis computer 150 may analyze root causes of application program 106 operational errors, acceptability of application program 106 communication latencies by geographic region, acceptability of application program 106 performance (e.g., displayed information refresh rate, responsiveness to user input, operational cycle repetition rate, etc.) by the user terminals 102*a*-10, which features of the application program 106 are most often used by user's separately or collectively and/or conversely which features are not used and/or avoided, types of the user terminals 102a-102n more frequently hosting the application program 106, geographic popularity of the application program 106, etc.

Figure 2A:
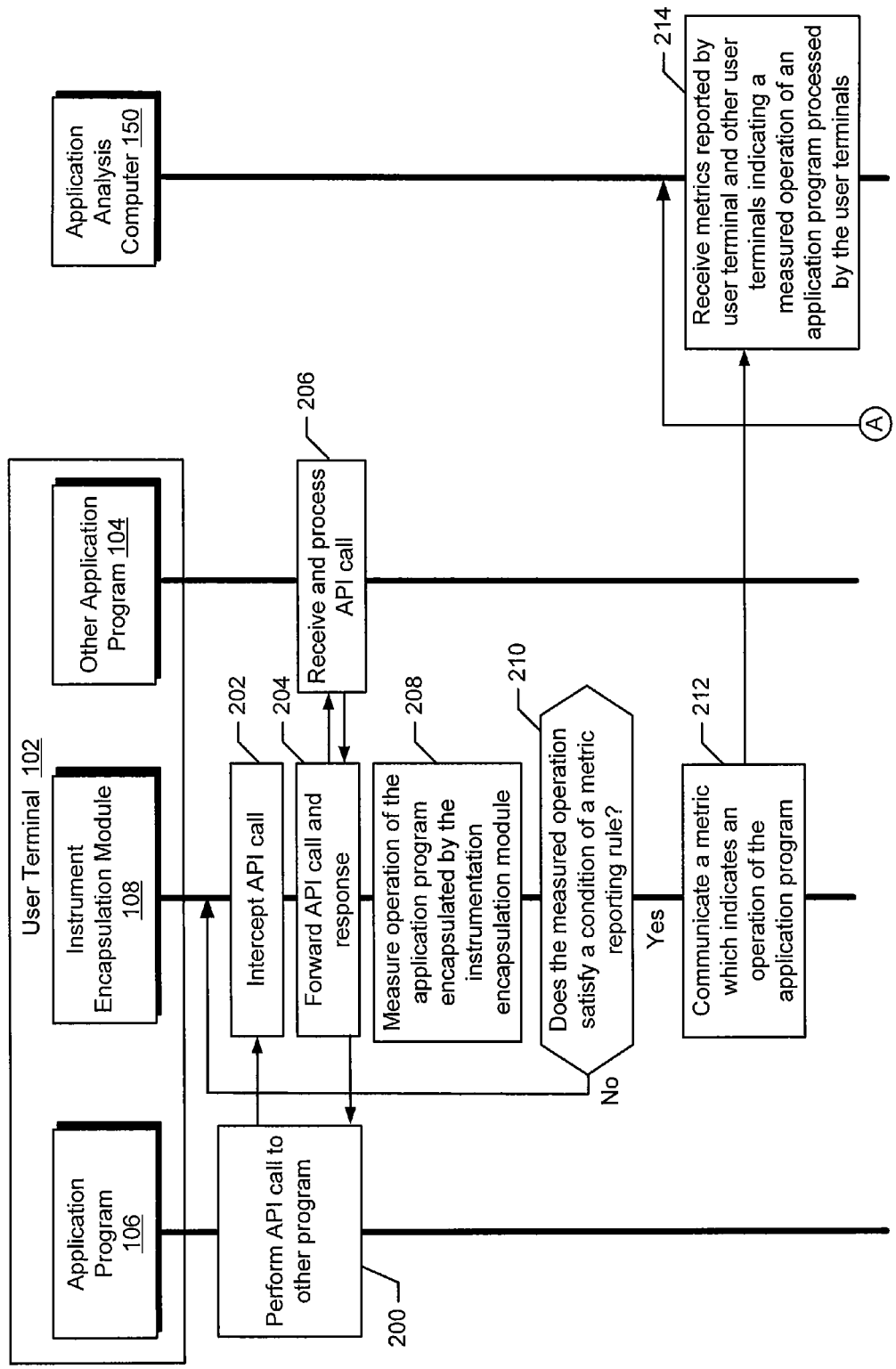
FIGS. 2A-2B are combined data flow diagrams and flowcharts of operations by a user terminal and an application analysis computer for controlling reporting by an instrument encapsulation module of application program operational metrics in accordance with some embodiments of the present disclosure.
Figure 2B:
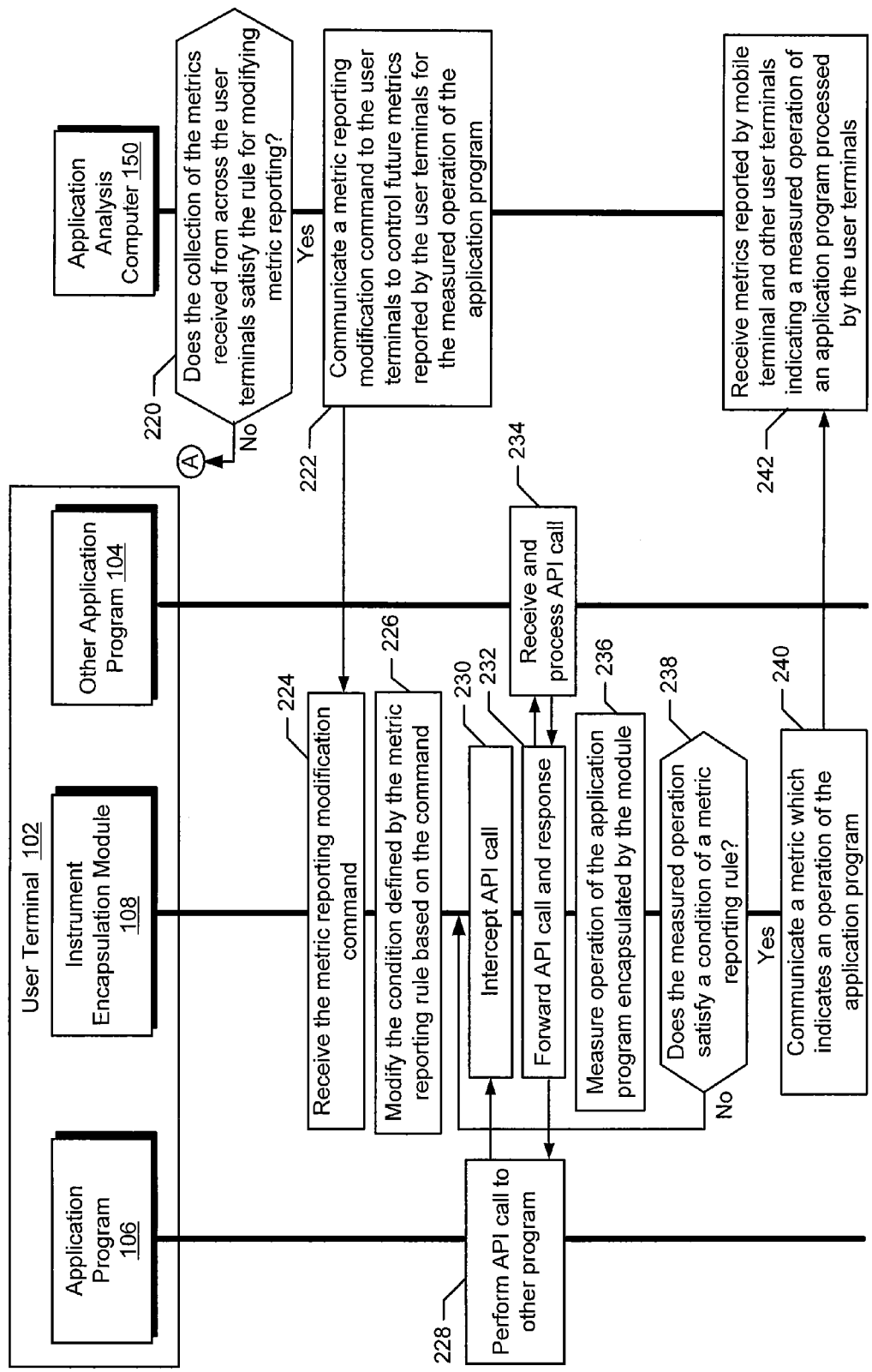

Further example embodiments of the present disclosure are now described in the context of FIGS. 2A-2B which are combined data flow diagrams and flowcharts of operations by the user terminal 102 and the application analysis computer 214 for controlling reporting by the instrument encapsulation module 108 of operational metrics of the application program 106. Referring to FIGS. 2A-2B, the application program 106 performs an API call (block 200) to the other application program 104. The instrument encapsulation module 108 intercepts (block 202) the API call. The instrument encapsulation module 108 forwards (block 204) the API call to the other application program 104, which receives and processes (block 206) the API call. The other application program 104 may communicate a response message which is intercepted and forwarded (block 204) through the instrument encapsulation module 108 to the application program 106.

The instrument encapsulation module 108 measures operation of the application program 106 to generate one or more of the metrics disclosed herein. It determines (block 210) whether the measured operation satisfies a condition of a metric reporting rule. When the condition of the metric reporting rule has not been satisfied the operations can loop back to wait for interception (block 202) of another API call performed by the application program 106. In contrast, when the condition of the metric reporting rule has been satisfied, the instrument encapsulation module 108 communicates (block 212) a metric, which indicates an operation of the application program 106, via the data network 120 to the application analysis computer 150.

The application analysis computer 150 receives (block 214) the metric reported by the instrument encapsulation module 108 of the user terminal 102 (e.g., user terminal 102a) along with metrics reported by other user terminals (e.g., user terminals 102b-102n). Each of the received metrics indicates a measured operation of an application program that is being processed by the respective user terminals (e.g., user terminals 102a-102n).

Referring to the continuing operations shown in FIG. 2b, the application analysis computer 150 determines (block 220) whether a collection of the metrics received from across the user terminals 102a-102n satisfies a rule for modifying metric reporting. When the rule for modifying metric reporting has not been satisfied, the operations may loop back to wait for receipt (block 214) of further metrics reported by at least some of the user terminals 102a-102n. In contrast, when the rule for modifying metric reporting has been satisfied, the application analysis computer 150 communicates (block 222) a metric reporting modification command to the user terminals 102a-102n to control future metrics reported by the user terminals 102a-102n for the measured operation of the application program 106.

The instrument encapsulation module 108 of the user terminal 102 (e.g., terminal 102a) receives (block 224) the metric reporting modification command, and modifies (block 226) the condition defined by the metric reporting rule based on the command. Modification of the condition defined by the metric reporting rule can include increasing or decreasing a threshold value compared against one or more of the operations that are measured by the instrument encapsulation module 108, which can include one or more of the metrics disclosed herein.

When the application program 106 subsequently performs (block 228) another API call to the other application program 104, the instrument encapsulation module 108 intercepts (block 230) the API call, forwards (block 232) the API call to the other application program 104 and forwards any response, which is generated by the other application program 100 for processing (block 234) the API call, to the application program 106. The instrument encapsulation module 108 measures operation of the application program 106 based on one or more of the metrics disclosed herein determined based on content of the API call and/or based on content of the response from the other application program 104.

The instrument encapsulation module 108 determines (block 238) whether the measured operation satisfies the modified condition of the metric reporting rule. When the modified condition of the metric reporting has not been satisfied the operations can loop back to wait for interception (block 230) of another API call performed by the application program 106. In contrast, when the modified condition of the metric reporting has been satisfied, the instrument encapsulation module 108 communicates (block 240) a metric, which indicates an operation of the application program 106, via the data network 120 to the application analysis computer 150.

The application analysis computer 150 receives (block 242) the metric reported by the instrument encapsulation module 108 of the user terminal 102 (e.g., user terminal 102a) along with metrics reported by other user terminals (e.g., user terminals 102b-102n). Each of the received metrics indicates a measured operation of an application program that is being processed by the respective user terminals (e.g., user terminals 102a-102n). The application analysis computer 150 can further repeat the operations to determine (block 220) whether a collection of the metrics received from across the user terminals 102a-102n satisfies the rule for modifying metric reporting and, if so, communicate (block 222) another metric reporting modification command to the instrument encapsulation module 108 of each of the user terminals 102a-102n to control future metrics that they report.

Further operations that may be performed by a user terminal 102 are described in the context of FIG. 2b. When measuring operation of the application program 106, the instrument encapsulation module 108 can measure (block 208/236) a number of the API calls by the application program 106, measure operation of the application program 106 based on the number of the API calls by the application program 106, and determine (block 238) when the number of the API calls by the application program 106 satisfies a defined threshold value. The instrument encapsulation module 108 may responsively increase the defined threshold value based on the metric reporting modification command from the application analysis computer 150, and decrease the defined threshold based on identifying an error condition in the measured operation of the application program 106.

In another embodiment, when monitoring API calls by the application program 106, the instrument encapsulation module 108 can identify content of the application programming interface calls by the application program 106, measure (block 208/236) operation of the application program 106 based on the content of the API calls by the application program 106. The instrument encapsulation module 108 can determine (block 210/238) when the measured operation satisfies the condition of the metric reporting rule based on determining when the content satisfies the condition of the metric reporting rule.

In another embodiment, when monitoring API calls by the application program 106, the instrument encapsulation module 108 can select an operational state of the application program 106, based on the content of the API calls, from among a plurality of different defined operational states in which the application program 106 can operate. The instrument encapsulation module 108 can determine (block 210/238) when the measured operation satisfies the condition of the metric reporting rule based on determining when the operational state satisfies the condition of the metric reporting rule.

When communicating (block 212) a metric, which indicates an operation of the application program processed by the processor of the user terminal 102, via the data network when the measured operation satisfies the condition of the metric reporting rule, the instrument encapsulation module 108 can communicate a defined subset of a defined set of a plurality of different measured operations of the application program 106, while preventing communicating of the plurality of different measured operations of the defined set that are outside the defined subset, to the application analysis computer 150 based on the condition of the metric reporting rule being satisfied. In contrast, the instrument encapsulation module 108 can communicate the defined set of the plurality of different measured operations of the application program 106 to the application analysis computer 150 based on the condition of the metric reporting rule not being satisfied.

The defined subset of the defined set of the plurality of different measured operations of the application program can be a listing of features of the application program 106 that have been performed by the user terminal 102. The defined set of the plurality of different measured operations of the application program 106 can be the listing of features of the application program 106 that have been performed by the user terminal 102, and a listing of operations performed by the application program 106 to accomplish at least one of the features.

When determining (block 210/238) when the operational state satisfies the condition of the metric reporting rule, the instrument encapsulation module 108 can determine when the application program 106 has transitioned from a defined other one of the operational states to the operational state a threshold number of times.

When selecting an operational state of the application program 106, based on the content of the API calls, from among the plurality of different defined operational states in which the application program 106 can operate, the instrument encapsulation module 108 can identify that a defined feature of the application program 106 has transitioned from a locked state preventing processing by a processor of the user terminal 102 to an unlocked state allowing processing by the processor.

When measuring (block 208/236) operation of the application program 106, the instrument encapsulation module 108 can monitor API calls by the application program 106, measure memory utilization and communication latency by the application program 106 being processed by a processor of the user terminal 102 based on the API calls, and generating the metric based on the memory utilization and the communication latency for communication (block 212) to the application analysis computer 150.

Further operations that may be performed by application analysis computer 150 are described in the context of FIG. 2b. When determining (block 220) when a collection of the metrics received from across the user terminals 120a-120n satisfies a rule for modifying metric reporting, the application analysis computer 150 can determine when a threshold number of metrics have been received from across a first threshold number of the user terminals 120a-120n (e.g., any 10,000 of the user terminals). When communicating (block 222) a metric reporting modification command to the user terminals 120a-120n, the application analysis computer 150 may communicate the metric reporting modification command to the user terminals 120a-120n to decrease how many future metrics are reported by the user terminals 120a-120n for the measured operation of the application program 106.

The application analysis computer 150 may determine when an error condition indicated by the metrics has been received from across a second threshold number of the user terminals (e.g., any 20 of the user terminals). The application analysis computer 150 can communicate another metric reporting modification command to the user terminals 120a-120n to increase how many future metrics are reported by the user terminals 120a-120n for the measured operation of the application program 106, based on the error condition indicated by the metrics being received from across the second threshold number of the user terminals.

When communicating (block 222) a metric reporting modification command to the user terminals 120a-120n, the application analysis computer 150 may communicate the metric reporting modification command to the user terminals 120a-120n to cause them to report a defined subset of a defined set of a plurality of different measured operations of the application program 106 to the application analysis computer 150 while preventing reporting of the plurality of different measured operations of the defined set that are outside the defined subset. When communicating (block 222) another metric reporting modification command to the user terminals 120a-120n to increase how many future metrics are reported by the user terminals 120a-120n for the measured operation of the application program 106, based on the error condition indicated by the metrics being received from across the second threshold number of the user terminals, the application analysis computer 150 may communicate the other metric reporting modification command to the user terminals 120a-120n to report the defined set of the plurality of different measured operations of the application program 106 to the application analysis computer 150.

The defined subset of the defined set of the plurality of different measured operations of the application program 106 may be a listing of features of the application program 106 that have been performed by the user terminals 120a-120n. The defined set of the plurality of different measured operations of the application program 106 may be the listing of features of the application program 106 that have been performed by the user terminals 120a-120n, a listing of operations performed by the application program 160 to accomplish at least one of the features, and a digital picture screen shot of an application window which is generated by the application program 160 and displayed on a display device of the user terminals 120a-120n.

To determine (block 220) when a collection of the metrics received from across the user terminals 120a-120n satisfies the metric reporting rule, the application analysis computer 150 may determine when an error condition indicated by the metrics has been received from across a threshold number of the user terminals 120a-120n. To communicate (block 222) a metric reporting modification command to the user terminals 120a-120n, the application analysis computer 150 may communicate the metric reporting modification command to the user terminals 120a-120n to increase how many future metrics are reported by the user terminals 120a-120n for the measured operation of the application program 106.

To determine (block 220) when a collection of the metrics received from across the user terminals 120a-120n satisfies the metric reporting rule, the application analysis computer 150 may determine when a threshold number of completed operation cycles of the application program 106 have been indicated by the metrics received from across a threshold number of the user terminals 120a-120n. To communicate (block 222) a metric reporting modification command to the user terminals 120a-120n, the application analysis computer 150 may communicate the metric reporting modification command to the user terminals 120a-120n to decrease how many future metrics are reported by the user terminals 120a-120n for the measured operation of the application program 106 based on the threshold number of completed operation cycles of the application program 106 having been indicated by the metrics received from across the threshold number of the user terminals 120a-120n.

To communicate (block 222) a metric reporting modification command to the user terminals 120a-120n to decrease how many future metrics are reported by the user terminals 120a-120n for the measured operation of the application program 106 based on the threshold number of completed operation cycles of the application program 106 having been indicated by the metrics received from across the threshold number of the user terminals 120a-120n, the application analysis computer 150 may communicate the metric reporting modification command to the user terminals 120a-120n to report a defined subset of a defined set of a plurality of different measured operations of the application program 106 to the application analysis computer 150 while preventing reporting of the plurality of different measured operations of the defined set that are outside the defined subset. The application analysis computer 150 may furthermore communicate another metric reporting modification command to the user terminals 120a-120n to report the defined set of the plurality of different measured operations of the application program 106 to the application analysis computer 150, based on identifying that an error condition indicated by the metrics has been received from across another threshold number of the user terminals 120a-120n.

Figure 3:
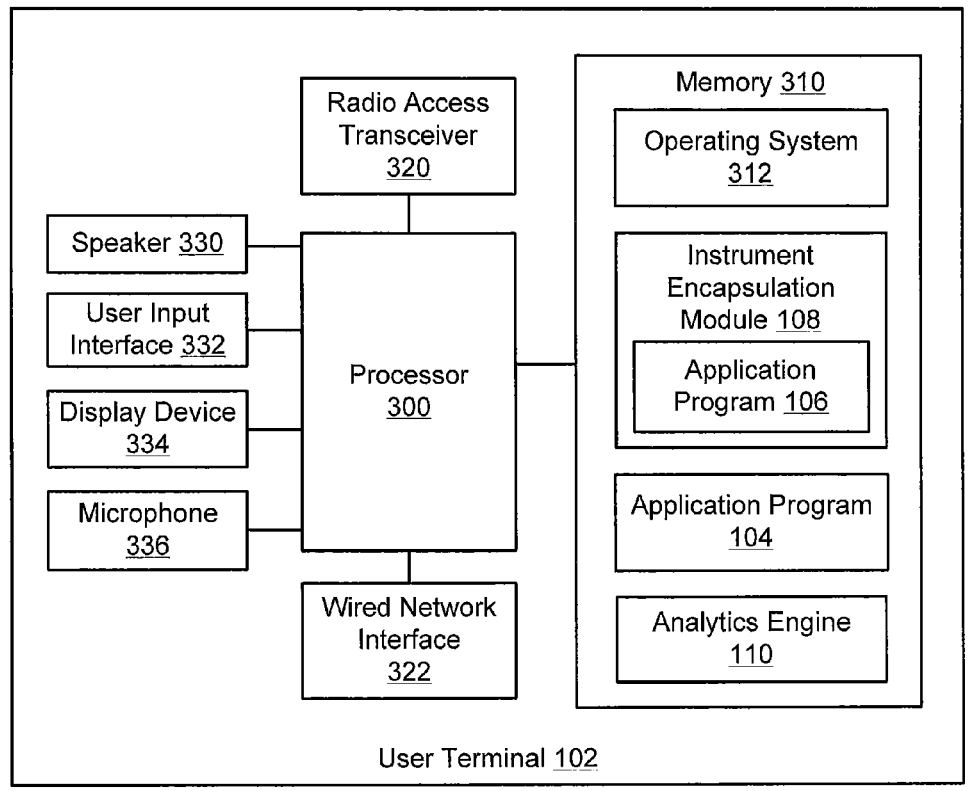
FIG. 3 is a block diagram of a user terminal configured according to some embodiments of the present disclosure.

FIG. 3 is a block diagram of a user terminal 102 configured according to some embodiments of the present disclosure. Referring to FIG. 3, the mobile terminal 102 includes a processor 300, a memory 310, and a network interface which may include a radio access transceiver 320 and/or a wired network interface 322 (e.g., Ethernet interface). The radio access transceiver 320 can include, but is not limited to, a LTE or other cellular transceiver, WLAN transceiver (IEEE 802.11), WiMax transceiver, or other radio communication transceiver configured to communicate with the application analysis computer 150 via a radio access network.

The processor 300 may include one or more data processing circuits, such as a general purpose and/or special purpose processor, such as a microprocessor and/or digital signal processor. The processor 300 is configured to execute computer program code in the memory 310, described below as a non-transitory computer readable medium, to perform at least some of the operations described herein as being performed by a user terminal. The computer program code may include an operating system 312, a plurality of application programs 104 and 106, an instrument encapsulation module 108, and an analytics engine 110. The instrument encapsulation module 108 encapsulates and measures operations by the application program 106. The analytics engine 110 may process data from measurements by the instrument encapsulation module 108 to generate one or more metrics for reporting. The user terminal 102 may further include a speaker 330, user input interface 332 (e.g., touch screen, keyboard, keypad, etc.), a display device 334, and a microphone 336.

As used herein, the term "user terminal" may include a satellite or cellular radiotelephone; a PDA or smart phone that can include a radiotelephone, pager, Internet/intranet access, Web browser, organizer, calendar and/or a global positioning system (GPS) receiver; and a tablet computer, laptop computer, desktop computer that includes a network interface allowing communication with an application analysis computer via a data network (e.g., private network and/or a public network such as the Internet).

Figure 4:
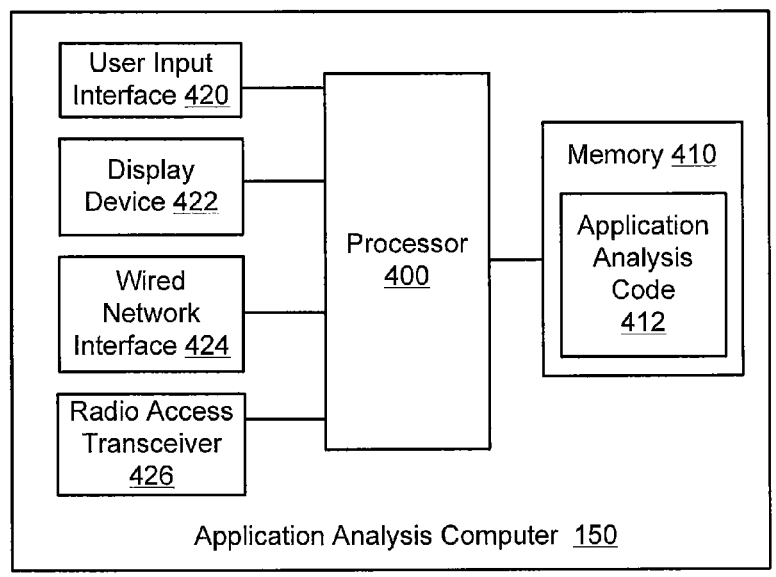
FIG. 4 is a block diagram of an application analysis computer configured according to some embodiments of the present disclosure.

FIG. 4 is a block diagram of an application analysis computer 150 configured according to some embodiments of the present disclosure. The application analysis computer 150 includes a processor 400, a memory 410, and a network interface which may include a radio access transceiver 426 and/or a wired network interface 424 (e.g., Ethernet interface). The radio access transceiver 426 can include, but is not limited to, a LTE or other cellular transceiver, WLAN transceiver (IEEE 802.11), WiMax transceiver, or other radio communication transceiver configured to communicate with the user terminal 102 via a radio access network.

The processor 400 may include one or more data processing circuits, such as a general purpose and/or special purpose processor (e.g., microprocessor and/or digital signal processor) that may be collocated or distributed across one or more networks. The processor 400 is configured to execute computer program code in the memory 410, described below as a non-transitory computer readable medium, to perform at least some of the operations described herein as being performed by an application analysis computer. The computer program code may include application analysis code 412. The application analysis computer 150 may further include a user input interface 420 (e.g., touch screen, keyboard, keypad, etc.) and a display device 422.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
performing operations as follows on a processor of an application analysis computer in communication with user terminals operating in a communication network, the operations comprising:
receiving metrics reported by user terminals via the communication network, the metrics indicating a measured operation of an application program processed by the user terminals during operations in the communication network;
determining a collection of the metrics received from across the user terminals satisfies a rule for modifying metric reporting, by operations comprising determining when a threshold number of metrics have been received from across a first threshold number of the user terminals;
based on the collection of the metrics received from across the user terminals being determined to satisfy the rule for modifying metric reporting, communicating a metric reporting modification command to the user terminals instructing the user terminals to cease measuring and reporting a defined set of a plurality of different measured operations of the application program to the application analysis computer and to start measuring and reporting a defined subset of the defined set of the plurality of different measured operations of the application program to the application analysis computer;
determining an error condition is indicated by the metrics to be occurring in the operational processing of the application program from across a second threshold number of the user terminals during operations in the communication network; and
based determining that the error condition is indicated by the metrics to be occurring in the operational processing of the application program from across the second threshold number of the user terminals, communicating another metric reporting modification command to the user terminals instructing the user terminals to cease measuring and reporting the defined subset of the defined set of the plurality of different measured operations of the application program to the application analysis computer and resume measuring and reporting the defined set of the plurality of different measured operations of the application program to the application analysis computer.

2. The method of claim 1, wherein:
the defined subset of the defined set of the plurality of different measured operations of the application program comprises a listing of features of the application program that have been performed by the user terminals; and
the defined set of the plurality of different measured operations of the application program comprises the listing of features of the application program that have been performed by the user terminals, a listing of operations performed by the application program to accomplish at least one of the features, and a digital picture screen shot of an application window which is generated by the application program and displayed on a display device of the user terminals.

3. The method of claim 1, wherein:
the determining a collection of the metrics received from across the first threshold number of user terminals satisfies the metric reporting rule, further comprises
determining a threshold number of the user terminals have each indicated by through the received metrics that they have each completed a threshold number of completed operation cycles of the application program; and
the communicating a metric reporting modification command to the user terminals, further comprises
based on determining that the threshold number of the user terminals have each indicated by through the received metrics that they have each completed a threshold number of completed operation cycles of the application program, communicating the metric reporting modification command to the user terminals to decrease how many future metrics are measured and reported by the user terminals for the measured operation of the application program.

4. The method of claim 3,
wherein the communicating the metric reporting modification command to the user terminals, further comprises
based on determining that the threshold number of the user terminals have each indicated by through the received metrics that they have each completed a threshold number of completed operation cycles of the application program, communicating the metric reporting modification command to the user terminals instructing the user terminals to cease measuring and reporting an initial defined set of the plurality of different measured operations of the application program to the application analysis computer and to start measuring and reporting the defined set of the plurality of different measured operations of the application program to the application analysis computer.

5. A computer program product, comprising:
a tangible computer readable storage medium comprising computer readable program code embodied in the medium that when executed by a processor of an application analysis computer in communication with user terminals operating in a communication network that causes the processor to perform operations comprising:
receiving metrics reported by user terminals via the communication network, the metrics indicating a measured operation of an application program processed by the user terminals during operations in the communication network;
determining a collection of the metrics received from across the user terminals satisfies a rule for modifying metric reporting, by operations comprising determining when a threshold number of metrics have been received from across a first threshold number of the user terminals;
based on the collection of the metrics received from across the user terminals being determined to satisfy the rule for modifying metric reporting, communicating a metric reporting modification command to the user terminals instructing the user terminals to cease measuring and reporting a defined set of a plurality of different measured operations of the application program to the application analysis computer and to start measuring and reporting a defined subset of the defined set of the plurality of different measured operations of the application program to the application analysis computer;

determining an error condition is indicated by the metrics to be occurring in the operational processing of the application program from across second threshold number of the user terminals during operations in the communication network; and based determining that the error condition is indicated by the metrics to be occurring in the operational processing of the application program from across the second threshold number of the user terminals, communicating another metric reporting modification command to the user terminals instructing the user terminals to cease measuring and reporting the defined subset of the defined set of the plurality of different measured operations of the application program to the application analysis computer and resume measuring and reporting the defined set of the plurality of different measured operations of the application program to the application analysis computer.

6. The computer program product of claim 5, wherein:
the defined subset of the defined set of the plurality of different measured operations of the application program comprises a listing of features of the application program that have been performed by the user terminals; and
the defined set of the plurality of different measured operations of the application program comprises the listing of features of the application program that have been performed by the user terminals, a listing of operations performed by the application program to accomplish at least one of the features, and a digital picture screen shot of an application window which is generated by the application program and displayed on a display device of the user terminals.

7. The computer program product of claim 5, wherein:
the determining when a collection of the metrics received from across the user terminals satisfies the metric reporting rule, further comprises
determining a threshold number of the user terminals have each indicated by through the received metrics that they have each completed a threshold number of completed operation cycles of the application program; and
the communicating a metric reporting modification command to the user terminals, further comprises
based on determining that the threshold number of the user terminals have each indicated by through the received metrics that they have each completed a threshold number of completed operation cycles of the application program, communicating the metric reporting modification command to the user terminals to decrease how many future metrics are measured and reported by the user terminals for the measured operation of the application program.

8. The computer program product of claim 7,
wherein the communicating the metric reporting modification command to the user terminals, further comprises
based on determining that the threshold number of the user terminals have each indicated by through the received metrics that they have each completed a threshold number of completed operation cycles of the application program, communicating the metric reporting modification command to the user terminals instructing the user terminals to cease measuring and reporting an initial defined set of the plurality of different measured operations of the application program to the application analysis computer and to start measuring and reporting the defined set of the plurality of different measured operations of the application program to the application analysis computer.

* * * * *